United States Patent
Dalgic et al.

(10) Patent No.: US 7,085,883 B1
(45) Date of Patent: Aug. 1, 2006

(54) METHOD AND APPARATUS FOR MIGRATING VOLUMES AND VIRTUAL DISKS

(75) Inventors: Ismail Dalgic, Sunnyvale, CA (US); Robert Eugene Gilligan, Burlingame, CA (US); F. Alan Jones, Menlo Park, CA (US); Kadir Ozdemir, San Jose, CA (US)

(73) Assignee: Intransa, Inc., San Jose, CA (US)

( * ) Notice: Subject to any disclaimer, the term of this patent is extended or adjusted under 35 U.S.C. 154(b) by 253 days.

(21) Appl. No.: 10/285,141

(22) Filed: Oct. 30, 2002

(51) Int. Cl.
*G06F 13/00* (2006.01)

(52) U.S. Cl. ...................................................... 711/114
(58) Field of Classification Search ................ 711/111, 711/112, 114
See application file for complete search history.

(56) References Cited

U.S. PATENT DOCUMENTS 6,480,934 B1 * 11/2002 Hino et al. ................. 711/114
2003/0200390 A1 * 10/2003 Moore et al. ............... 711/114

OTHER PUBLICATIONS

SNIA IP Storage Forum, "iSCSI Technical White Paper", Jul. 29, 2002, pp. 1-10.*

* cited by examiner

Primary Examiner—Pierre Vital
(74) Attorney, Agent, or Firm—Dorsey & Whitney LLP

(57) ABSTRACT

Method and apparatus for migrating a volume and a virtual disk from a first storage controller to a second storage controller in a distributed storage system having volumes and virtual disks associated with storage controllers. In one embodiment, the virtual disk is migrated to the second storage controller, and requests for data reads/writes associated with the virtual disk are routed to the second controller. Further, in another embodiment, the volume is migrated to the second storage controller, and requests for data reads/writes associated with the volume are routed to the second controller. A contact address may be associated with a plurality of storage controllers and once a session between an application server and a volume is established, the application server may be redirected so as to communicate with the storage controller associated with the volume using the IP address of the storage controller. In this manner, the volumes and the virtual disks may be migrated, independently if desired, to other storage controllers in the network without disrupting the data flow between the application server and the storage controllers.

25 Claims, 12 Drawing Sheets

METHOD AND APPARATUS FOR MIGRATING VOLUMES AND VIRTUAL DISKS

TECHNICAL FIELD

This application relates, in general, to storage devices, and more particularly to networked storage devices.

BACKGROUND

As recognized by the present inventors, in distributed storage systems there are instances where functions performed by a storage controller and associated with other components in the system may need to be migrated to other storage controllers in the distributed storage network. For instance, if a storage controller in the storage network fails, then the tasks and responsibilities associated with the failed storage controller need to be transferred or migrated to another storage controller in the network. Alternatively, if a particular storage controller is handling an excessive load, then it may be beneficial to distribute portions of the load to other storage controllers using migration, as recognized by the present inventors.

Accordingly, what is needed is a method and apparatus capable of migrating volumes and/or virtual disks from a first storage controller to one or more other storage controllers in a distributed storage network. In performing a migration, as recognized by the present inventors, it is desirable to perform such migration without interruption of data reads/writes that are in progress, such that the migration is transparent to the end user or process accessing the data stored in the distributed storage network.

It is against this background that various embodiments of the present invention were developed.

SUMMARY OF THE INVENTION

In light of the above and according to one broad aspect of one embodiment of the present invention, disclosed herein is a method for migrating a volume and a virtual disk from a first storage controller to a second storage controller in a distributed storage system having volumes and virtual disks associated with storage controllers. In one embodiment, the method includes migrating the virtual disk to the second storage controller, and routing requests for data reads/writes associated with the virtual disk to the second controller. Further, in another embodiment, the method may also include migrating the volume to the second storage controller, and routing requests for data reads/writes associated with the volume to the second controller. A contact address may be associated with a plurality of storage controllers and once a session between an application server and a volume is established, the application server may be redirected so as to communicate with the storage controller associated with the volume using the IP address of the storage controller. In this manner, the volume and the virtual disks may be migrated, independently if desired, to other storage controllers in the network when, for instance, a storage controller fails or for load balancing purposes.

In one embodiment, the operation of migrating the virtual disk includes configuring the virtual disk to be serviced by the second storage controller; configuring the second storage controller to communicate with the physical disks associated with the virtual disk; and configuring volumes associated with the virtual disk to communicate with the second storage controller. In another embodiment, the operation of migrating the volume includes configuring the volume to be serviced by the second storage controller; configuring the second controller to communicate with the virtual disks associated with that volume; and redirecting the application servers associated with the volume to communicate with the second storage controller.

In another embodiment, a storage controller is disclosed herein and may include a module to service volumes, a module to service virtual disks, and a module for migrating volumes and the virtual disks from the storage controller to another storage controller.

Various embodiments of the present invention may be embodied as computer program products including computer usable medium and computer readable code embodied on the computer usable medium, the computer readable code including computer readable program code devices configured to cause the computer to perform or effect one or more of the operations described herein.

The features, utilities and advantages of various embodiments of the invention will be apparent from the following more particular description of embodiments of the invention as illustrated in the accompanying drawings.

DETAILED DESCRIPTION

According to one broad aspect of one embodiment of the present invention, disclosed herein is a method and apparatus for migrating one or more volumes and/or one or more virtual disks from a first storage controller to other storage controllers in a distributed storage system having volumes and virtual disks associated with storage controllers. The volumes and virtual disks associated with a storage controller can be migrated independently, dynamically, and seamlessly to the other storage controllers in the distributed storage system. Various embodiments of the invention will now be described.

Figure 1:
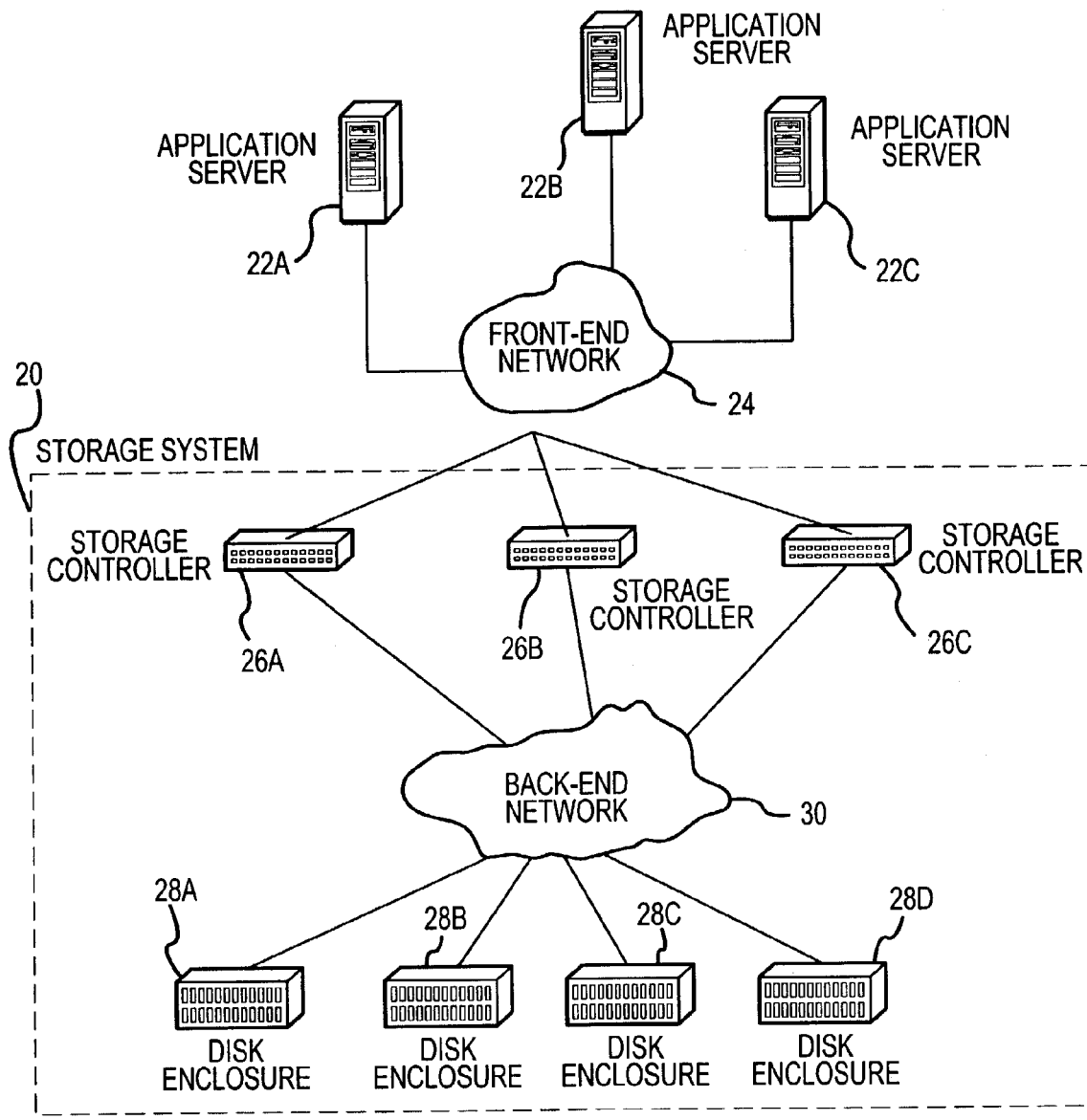
FIG. 1 illustrates a block diagram of an example of a distributed storage network, in accordance with one embodiment of the present invention.

FIG. 1 illustrates an example of a distributed storage system 20 in accordance with one embodiment of the present invention. In FIG. 1, a plurality of application servers 22A, B, C, each capable of hosting application programs (not shown), access a distributed storage system through a front end network 24. Generally, application programs running on one or more of the application servers 22A, B, C will perform operations which require that data be read from or written to the distributed storage system 20. As will be described below in greater detail, the distributed storage system 20 may include one or more storage controllers 26A, B, C coupled with one or more data storage disk enclosures 28A, B, C, D through a back end network 30, wherein each disk enclosure 28A, B, C, D includes one or more physical disks (shown in FIG. 2 as 32A, B, C, D). The distributed storage system 20 will satisfy the read/write requests of the application servers 22A, B, C through the use of the storage controllers 26A, B, C and disk enclosures 28A, B, C, D/physical disks 32A, B, C, D in a robust and reliable manner.

Each storage controller 26A, B, C serves as one or more iSCSI target(s) to receive data read/write requests over the front end network 24 from one or more application servers 22A, B, C, and the storage controller processes the requests using the appropriate physical disks 32A, B, C, D included in the disk enclosures 28A, B, C, D. In one example, the front end network 24 is an IP network such as the Internet, over which the application servers 22A, B, C and storage controllers 26A, B, C communicate using the iSCSI protocol. A storage controller 26A, B, C may also communicate with other storage controllers 26A, B, C over the front end network 24 or back end network 30 to communicate data relating to the operating conditions, loads, or other performance or management information relating to the storage system 20. It is understood that the front end network 24 may employ other protocols, such as NFS or CIFS, or network types, such as Fibre channel.

Each storage controller 26A, B, C may provide various functions for the distributed storage network 20. For example, the storage controller 26A, B, C may provide various volume management functions, such as virtualization wherein multiple physical disks 32A, B, C, D are presented as a single virtual device to an application server 22A, B, C. The storage controller 26A, B, C may also provide data reliability functions by utilizing techniques and configurations such as disk mirroring or RAID (redundant array of inexpensive disks), or error detection and correction. The storage controller 26A, B, C may also provide detection of faults which occur on the disks 32A, B, C, D, failover capabilities to other storage controllers 26A, B, C, balancing of data read/write loads distributed across different storage controllers 26A, B, C for improved performance, system monitoring of the disks 32A, B, C, D and/or of other storage controllers 26A, B, C, security, power management, and/or data caching.

Over the back end network 30, the storage controllers 26A, B, C communicate with disk enclosures 28A, B, C, D, shown in FIG. 1, which each contains one or more physical disks 32A, B, C, D. The disk enclosures 28A, B, C, D provide a housing for the respective physical disks 32A, B, C, D, as well as logic for translating commands received from the back end network 30 to the native protocol, such as IDE/ATA or SCSI, of the physical disks. Each disk enclosure 28A, B, C, D may contain one or more physical disks shown as 32A, B, C, D in FIG. 2, and in one example, a disk enclosure may include 16 physical disks. The back end network 30 may utilize an iSCSI protocol over an IP network or may utilize other block transport protocols. The backend network 30 may employ Ethernet, Fibre channel, or other network technologies.

In the distributed storage network 20, data may be stored in blocks on the physical disks 32A, B, C, D, in one embodiment. The storage controller 26A, B, C manages the data blocks by maintaining mappings of the blocks using volumes 40A, B, C and virtual disks 42A, 42C.

A volume 40 A, B, C may include a collection of extents or contiguous sets of blocks from one or more virtual disks 42A, 42C. Volumes 40A, B, C may be presented as individual iSCSI targets to the application servers 22A, B, C. Volumes 40A, B, C provide flexibility in the storage system by permitting dynamic changes in size and capacity of virtual disks through the use of blocks from two or more virtual disks. Multiple volumes may be used to form a mirror set, if desired.

Virtual disks 42A, C are arranged in order to provide reliability and performance, and may include an aggregation of one or more physical disks 32A, B, C, D which may be grouped together for performance, capacity, and/or reliability. For instance, the aggregation or groupings associated with a virtual disk 42A, 42C may include RAID disk arrays or configurations (e.g., RAID-1 or RAID-5), or simple concatenations of two or more physical disks 32A, B, C, D.

Figure 2:
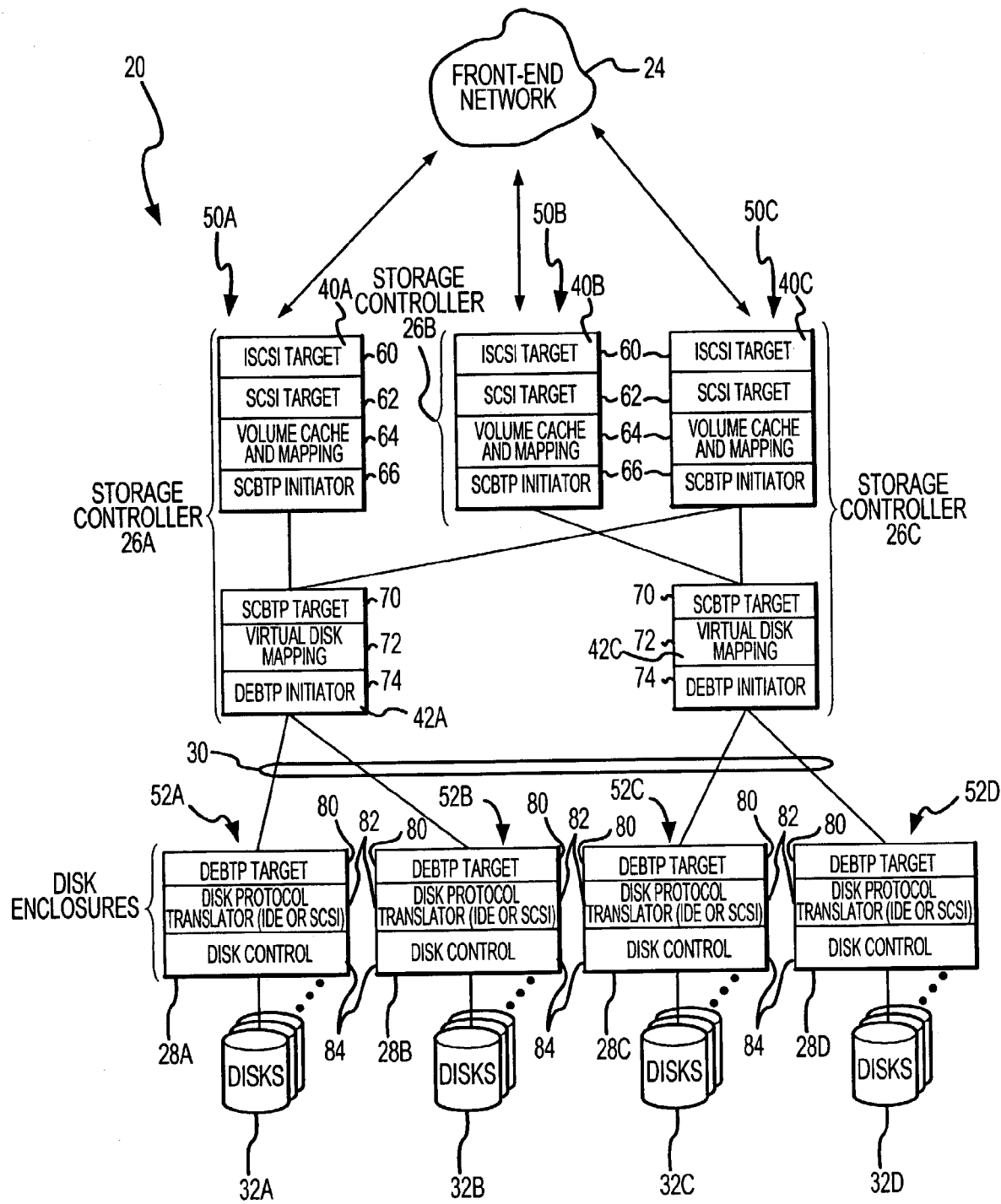
FIG. 2 illustrates a block diagram of an example of a protocol stack operating on storage controllers and disk enclosures, in accordance with one embodiment of the present invention.

In overall operation and referring to FIG. 2, when an application server 22A, B, C requests to read or write data, the application server 22A, B, C communicates with a volume 40A, B, C which is associated with a particular storage controller 26A, B, C. The volume 40A, B, C then communicates with the appropriate virtual disk 42A, 42C, associated with a particular storage controller 26A, C, regarding the data read/write request. The virtual disk 42A, 42C then reads or writes the data from/to one or more physical disks 32A, B, C, D in order to satisfy the request from the application server 22A, B, C. Once the operation has been completed at the physical disk level, the results of the operation (i.e., for read operations, blocks of data, and for write operations, a status response) are transferred from the physical disk 32A, B, C, D to the appropriate storage controller 26A, B, C to the application server/end user—the results are passed from the physical disks 32A, B, C, D to the virtual disk 42A, 42C, then through the volume 40A, B, C, and back to the application server 22A, B, C that initiated the request.

Assuming that there is a need to migrate the volumes 40A, B, C or virtual disks 42A, 42C associated with a storage controller to another storage controller (for example, due to a storage controller failure or for load balancing purposes), the volumes 40A, B, C of a storage controller and the virtual disks 42A, 42C of a storage controller may each be migrated independently and dynamically to another storage controller.

FIG. 2 illustrates a block diagram of an example of a plurality of storage controllers 26A, B, C and their respective protocol stacks 50A, B, C, along with a plurality of disk enclosures 28A, B, C, D and their respective protocol stacks 52A, B, C, D coupled with a plurality of physical disks 32A, B, C, D, in accordance with one embodiment of the present invention. Volumes 40A, B, C and virtual disks 42A, 42C are associated with particular storage controllers 26A, B, C, and the volumes and/or the virtual disks can be migrated, independently and dynamically, to different storage controllers within the distributed storage network 20.

In the example of FIG. 2, storage controller 26A has a volume 40A associated therewith and a virtual disk 42A associated therewith. The virtual disk 42A of storage controller 26A is shown as being related with physical disks 32A and 32B through disk enclosures 28A, B. Storage controller 26B has a volume 40B associated therewith, and a virtual disk 42C which resides in storage controller 26C and controls physical disks 32C, D, in this example. Storage controller 26C has a volume 40C and a virtual disk 42C hosted thereon, while the volume 42C of storage controller 26C also accesses the virtual disk 42A hosted by storage controller 26A. Accordingly, storage controller 26A can access data on physical disks 32A, B; storage controller 26B can access data on physical disks 32C, D; and storage controller 26C has access to data on physical disks 32A, B, C, D, in this example.

A volume 40A, B, C of a storage controller 26A, B, C may include a protocol stack 40A, B, C, as shown in FIG. 2, having an iSCSI target portion 60, a SCSI target portion 62, a volume cache and mapping portion 64, and a storage controller block transport protocol (SCBTP) initiator 66.

In one example, the iSCSI target portion 60 provides an implementation of the iSCSI protocol as a target available over the front end network 24 for the application servers 22A, B, C. The SCSI target portion 60 may specify a logical unit that corresponds to a volume 40A, B, C. In one example, a one-to-one mapping between the iSCSI target, the SCSI target and the volume is provided which may form a single logical unit.

The volume cache and mapping portion 64 of the volume provides a data cache associated with the volume, and performs a mapping between the volume 40A, B, C and the contiguous sets of blocks of data (i.e., extents) that are part of a virtual disk 42A, C. The mapping, in one example, provides associations between block addresses of volumes 40A, B, C to the block addresses of virtual disks 42A, C, and one volume may be mapped to extents from multiple virtual disks. As other examples, mappings may involve more complex functions to achieve greater data reliability or system performance such as mirrored volumes or incremental snapshots.

The SCBTP initiator portion 66 of a volume establishes a block transfer protocol over the backend network 30 from a storage controller responsible for the volume, to a storage controller that handles the virtual disk. The protocol may include iSCSI, Fibre channel, or other protocols.

A virtual disk 42A, 42C of a storage controller may include protocol layers having an SCBTP target portion 70, a virtual disk mapping portion 72, and a disk enclosure block transport protocol (DEBTP) initiator 74.

The SCBTP target portion 70 is designed to communicate with the SCBTP initiator portion 66 of a volume of a storage controller. The virtual disk mapping portion 72 of the virtual disk maps block addresses of the virtual disks to block addresses of the physical disks. The mappings 72 may be simple, or may involve more complex functions to achieve greater data reliability or system performance such as mirrored disks (RAID-1) or RAID-5 mappings wherein some blocks are used for parity information. The DEBTP initiator portion 74 handles the block transfers from the storage controller 26A, B, C to the disk enclosure 28A, B, C, D, and may include protocols such as iSCSI, Fibre channel, or other protocols.

A disk enclosure 28A, B, C, D may have protocol stack layers including, in one example, a DEBTP target portion 80, a disk protocol translator portion 82, and a disk control portion 84. The DEBTP target portion 80 corresponds to the DEBTP initiator portion 74 of the virtual disk, while the disk protocol translator portion 82 translates commands from the block transfer protocols to the appropriate commands which the physical disks 32A, B, C, D of the disk enclosure understands—such as IDE or SCSI, for example. The disk control portion 84 includes logic to control the physical disks 32A, B, C, D.

While each storage controller 26A, B, C in the example of FIG. 2 is shown having a volume and/or a virtual disk, it is understood that each storage controller may have multiple volumes and/or virtual disks associated therewith. Likewise, each disk enclosure may have multiple instances of the target, translator and control portions, with one instance per disk.

In one example, each storage controller 26A, B, C maintains copies of all mappings (volume and cache mappings 64 of a volume, and virtual disk mappings 72 of a virtual disk) of all other storage controllers 26A, B, C in the distributed storage system, so that if a particular storage controller unexpectedly fails, then the other storage controllers 26A, B, C are already aware of the mappings maintained by the failed storage controller.

Figure 3:
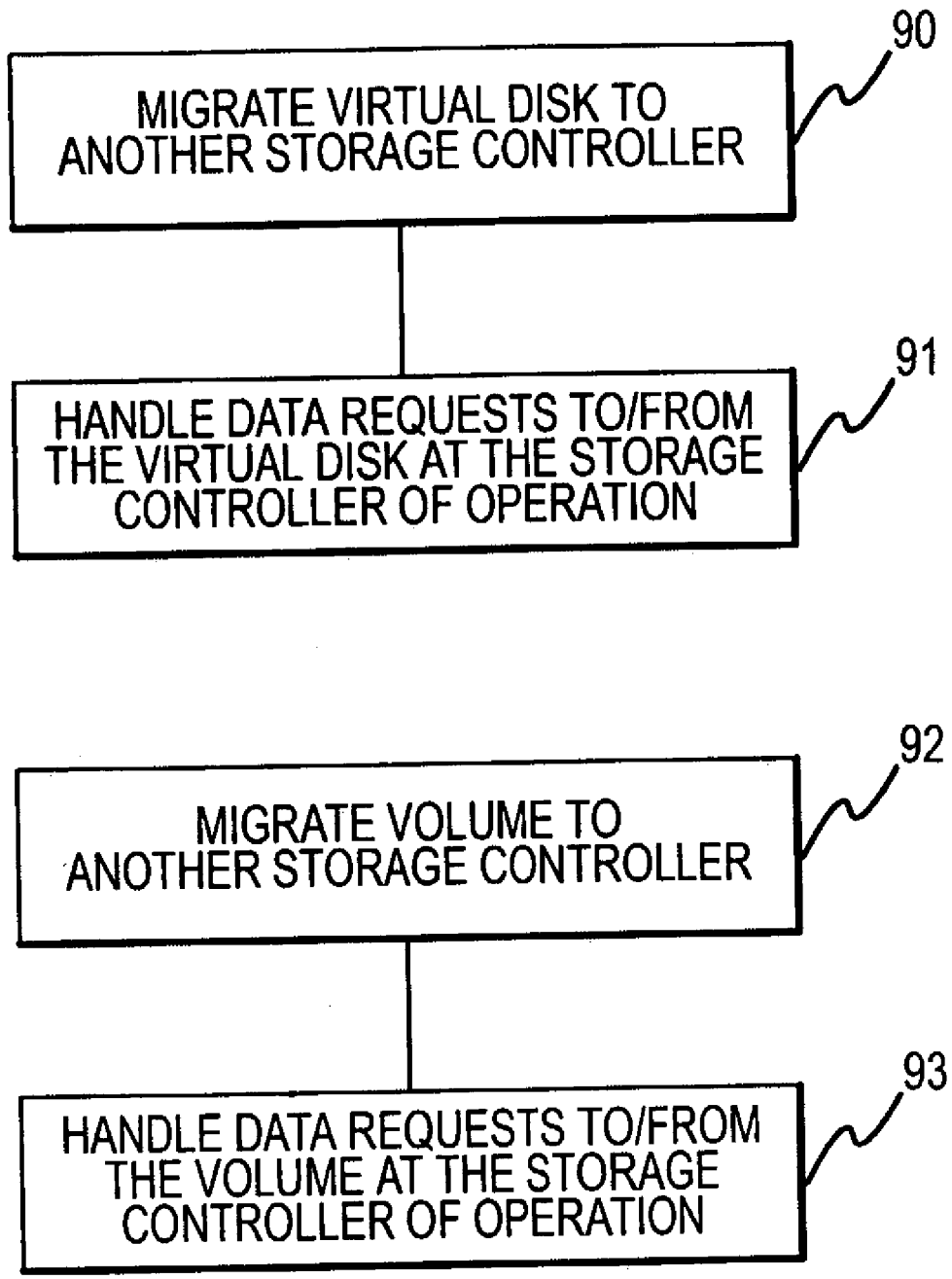
FIG. 3 illustrates an example of logical operations for migrating virtual disks and/or volumes independently, in accordance with one embodiment of the present invention.

In accordance with an embodiment of the present invention, volumes 40A, B, C and/or virtual disks 42A, 42C can be migrated independently to various storage controllers as needed, which moves or relocates the access points associated with blocks of data. FIG. 3 illustrates an example of logical operations in accordance with one embodiment of the present invention. At operation 90, a virtual disk assigned to a storage controller is migrated to a new storage controller. Operation 90 may be performed, for example, when a storage controller fails or for load balancing purposes, or for other reasons as desired. At operation 91, data read/write requests related to the virtual disk are handled by the appropriate storage controller in view of the migration which occurred at operation 90.

Independently from operations 90–91, operation 92 migrates a volume assigned to storage controller to another storage controller. Operation 92 may be performed when a storage controller fails or for load balancing purposes, or for other reasons as desired. At operation 93, data read/write requests related to the volume are handled by the appropriate storage controller in view of the migration which occurred at operation 92.

The migration of the volume to the storage controller (operation 93) may or may not be to the same storage controller as in operation 90, depending upon the particular implementation. In other words, operations 90 and 92 may migrate the virtual disk and the volume to the same storage controller, or operations 90 and 92 may migrate the virtual disk and volume to separate storage controllers. Note that it may be possible to perform operations 90–91 without performing operation 92–93, or to perform operation 92–93 without performing operations 90–91, depending upon the particular implementation. In accordance with an embodiment of the present invention, operations 90–91 and 92–93 may be performed independently and dynamically.

Figure 4:
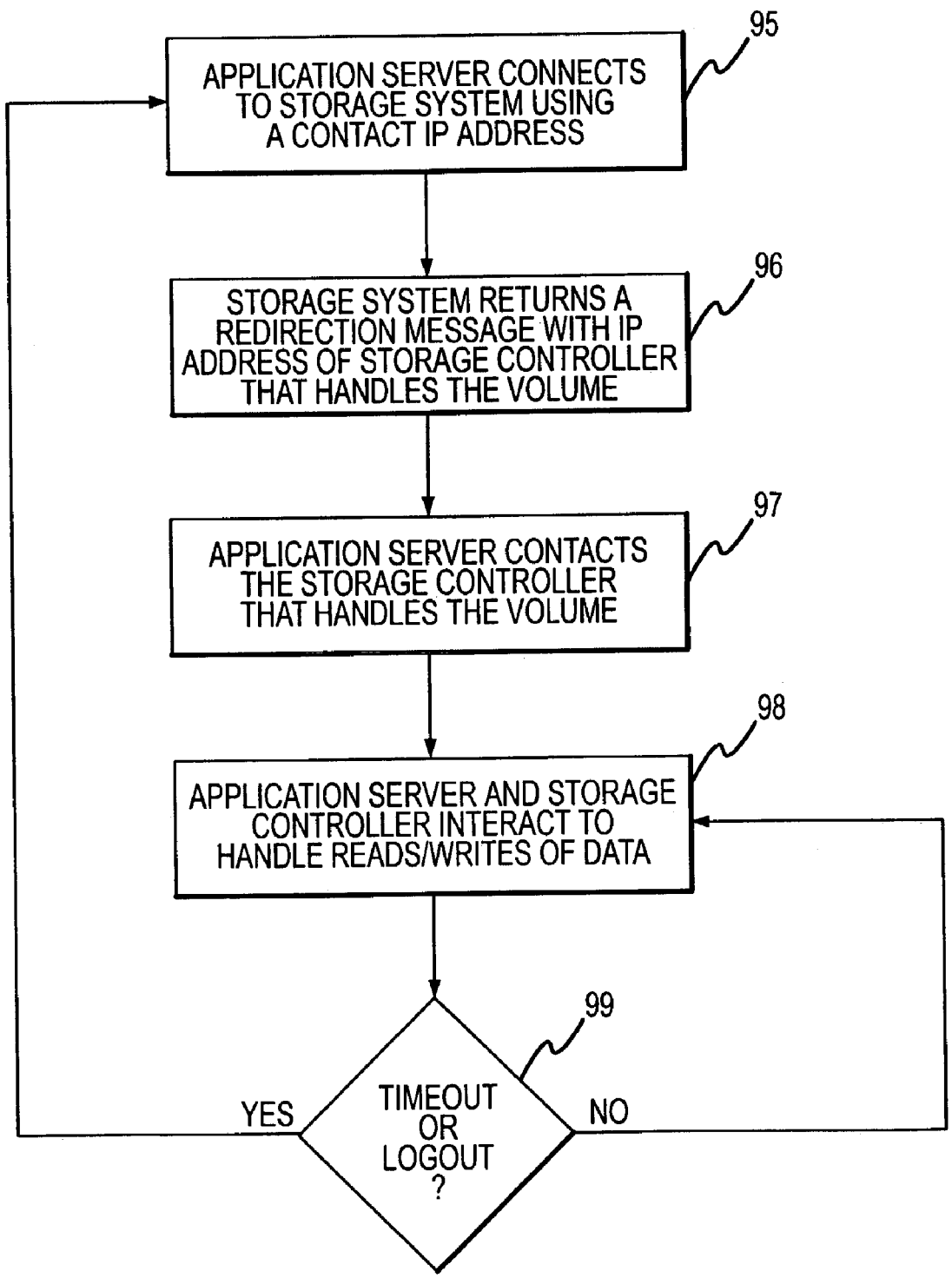
FIG. 4 illustrates an example of logical operations for establishing a communication session between an application server and a storage controller, in accordance with one embodiment of the present invention.

The application servers 22A, B, C communicate with the storage system 20 over network 24 (shown in FIG. 1). FIG. 4 illustrates an example of logical operations for establishing a communication session between an application server and a storage controller, in accordance with one embodiment of the present invention. These operations may be used to establish an iSCSI session between an application server and a storage controller of the storage system.

At operation 95, an application server connects to the storage system using a contact IP address. For a given the IP contact address, there may be multiple iSCSI names, wherein each iSCSI name is associated with a particular volume. Accordingly, when an application server is desirous of accessing or writing data relating to a particular volume, the application server establishes an iSCSI session with a particular volume by specifying a particular iSCSI name.

At operation 96, the storage system returns a redirection message to the application server which includes an IP address of the storage controller that handles the volume associated with the iSCSI name specified by the application server at operation 95. In this manner, the storage system enables the application server to communicate with the particular storage controller which handles the volume with which the application server desires to perform data operations.

At operation 97, the application server contacts the storage controller using the IP address provided by operation 96, thereby establishing an iSCSI session between the application server and the storage controller. At operation 98, the application server and storage controller interact to handle and process various data operations, including writing data to the storage controller and reading data from the storage controller. In the event of a storage controller failure or other loss of communications between the application server and the storage controller, or the event that the storage controller issues a log-out command to the application server, at operation 99 such condition(s) are detected and the application server re-connects to the storage system using the contact IP address as in operation 95.

Various embodiment of the present invention permit for a virtual disk associated with a volume to be migrated from a first storage controller to a second or new storage controller in the event of failure of the first storage controller, as described below with reference to FIGS. 5–6, or without affecting the iSCSI session established by operation 98, as described below with reference to FIGS. 9–10. Also, a volume may be migrated from a first storage controller to a second or new storage controller in the event of failure of the first storage controller, as described below with reference to FIGS. 7–8, or by gracefully logging out the iSCSI session established by operation 98, as described below with reference to FIGS. 11–12. As used herein, the term "new storage controller" may include, for example, a storage controller that has been newly added to or made live in the storage system, or may include an existing storage controller already operating in the storage system.

Figure 5:
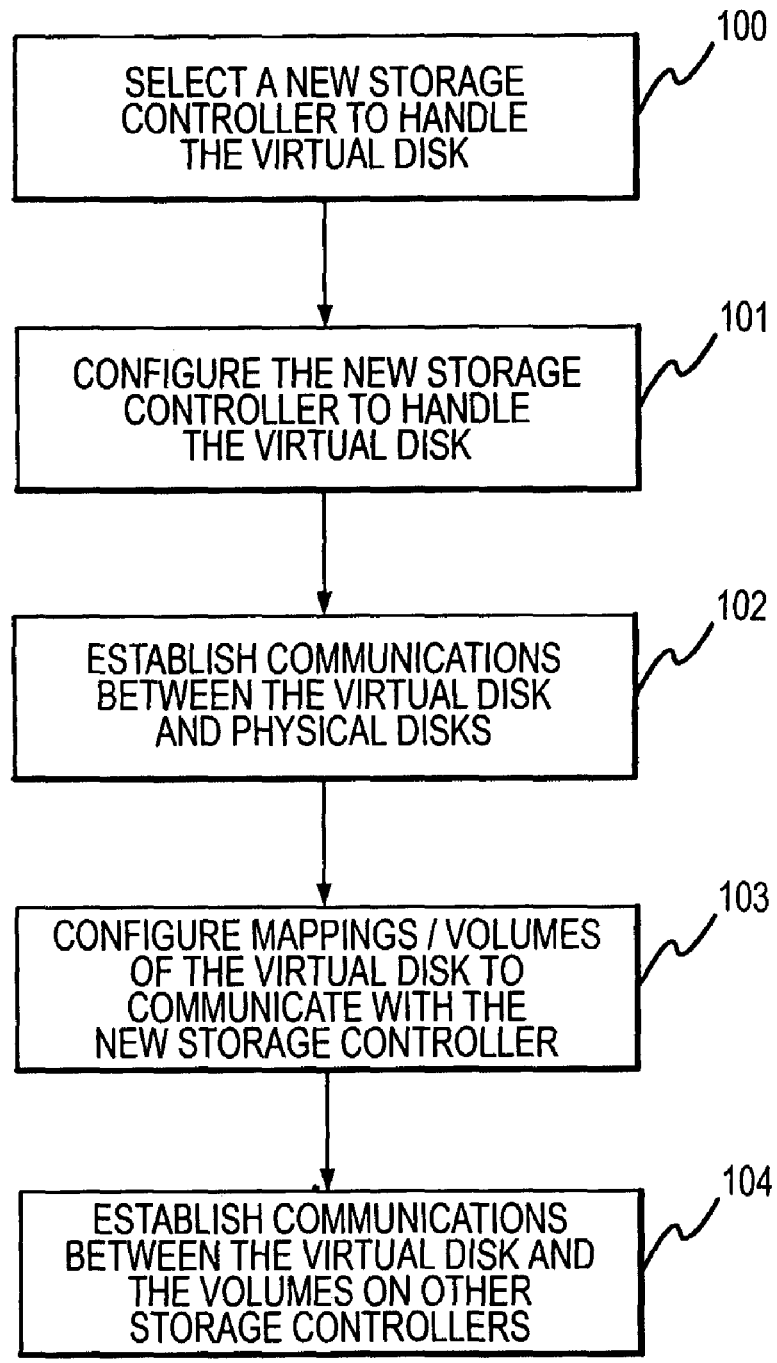
FIG. 5 illustrates an example of logical operations for migrating a virtual disk from a first storage controller to a second storage controller in the event of a failure of the first storage controller, in accordance with one embodiment of the present invention.
Figure 6:
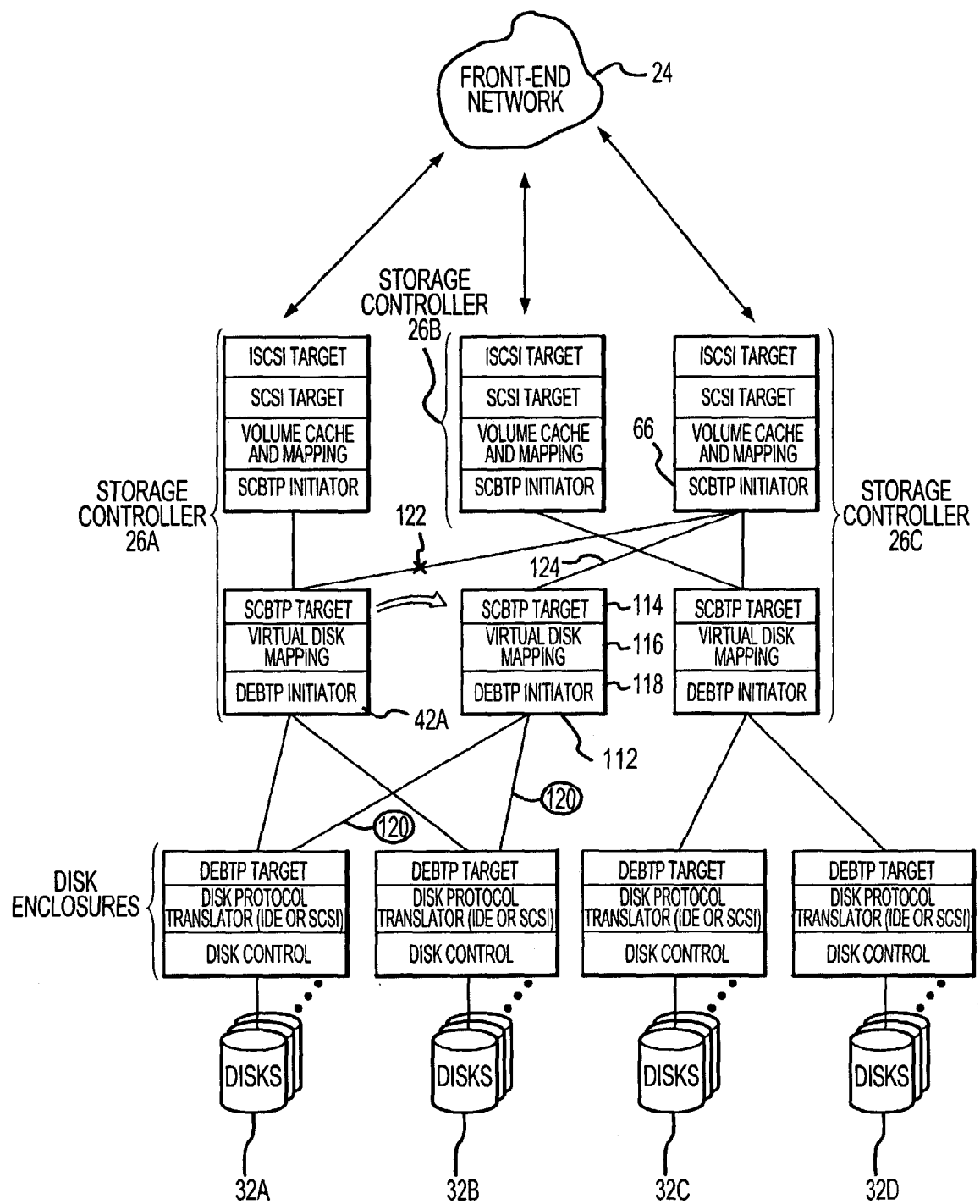
FIG. 6 illustrates an example of a virtual disk migration from storage controller 26A to storage controller 26B, in accordance with one embodiment of the present invention.
Figure 7:
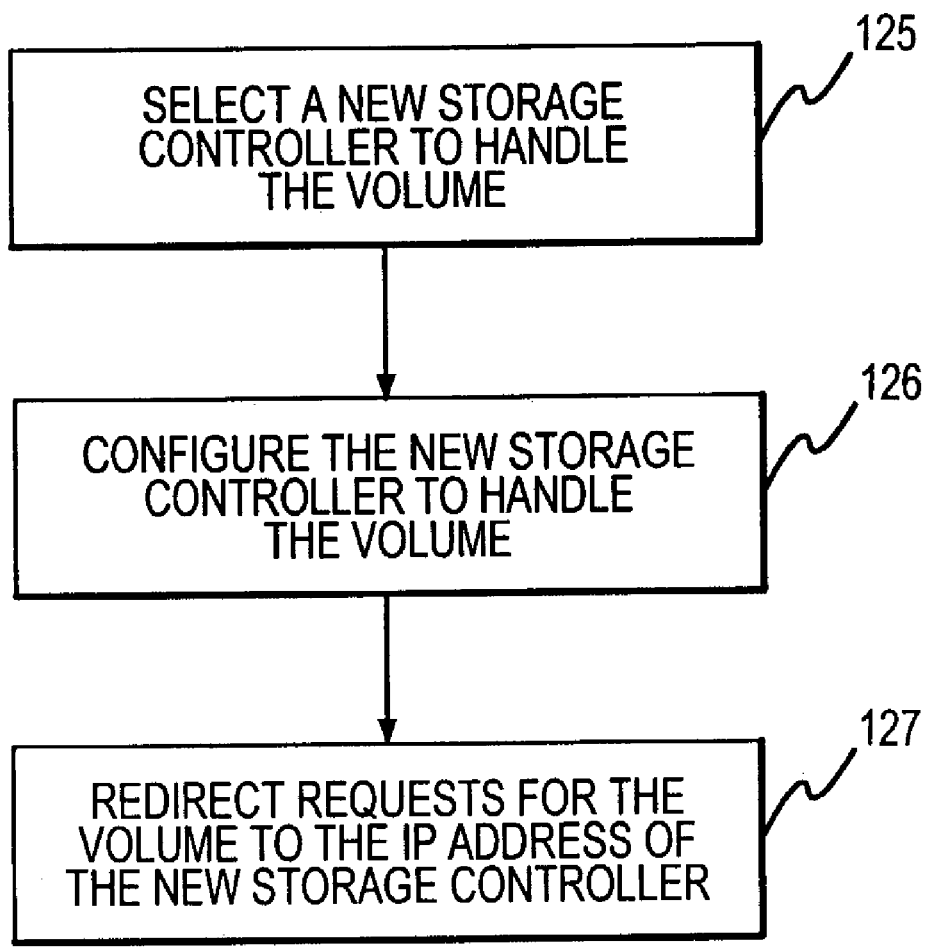
FIG. 7 illustrates an example of logical operations for migrating a volume from a first storage controller to a second storage controller in the event of a failure of the first storage controller, in accordance with one embodiment of the present invention.
Figure 8:
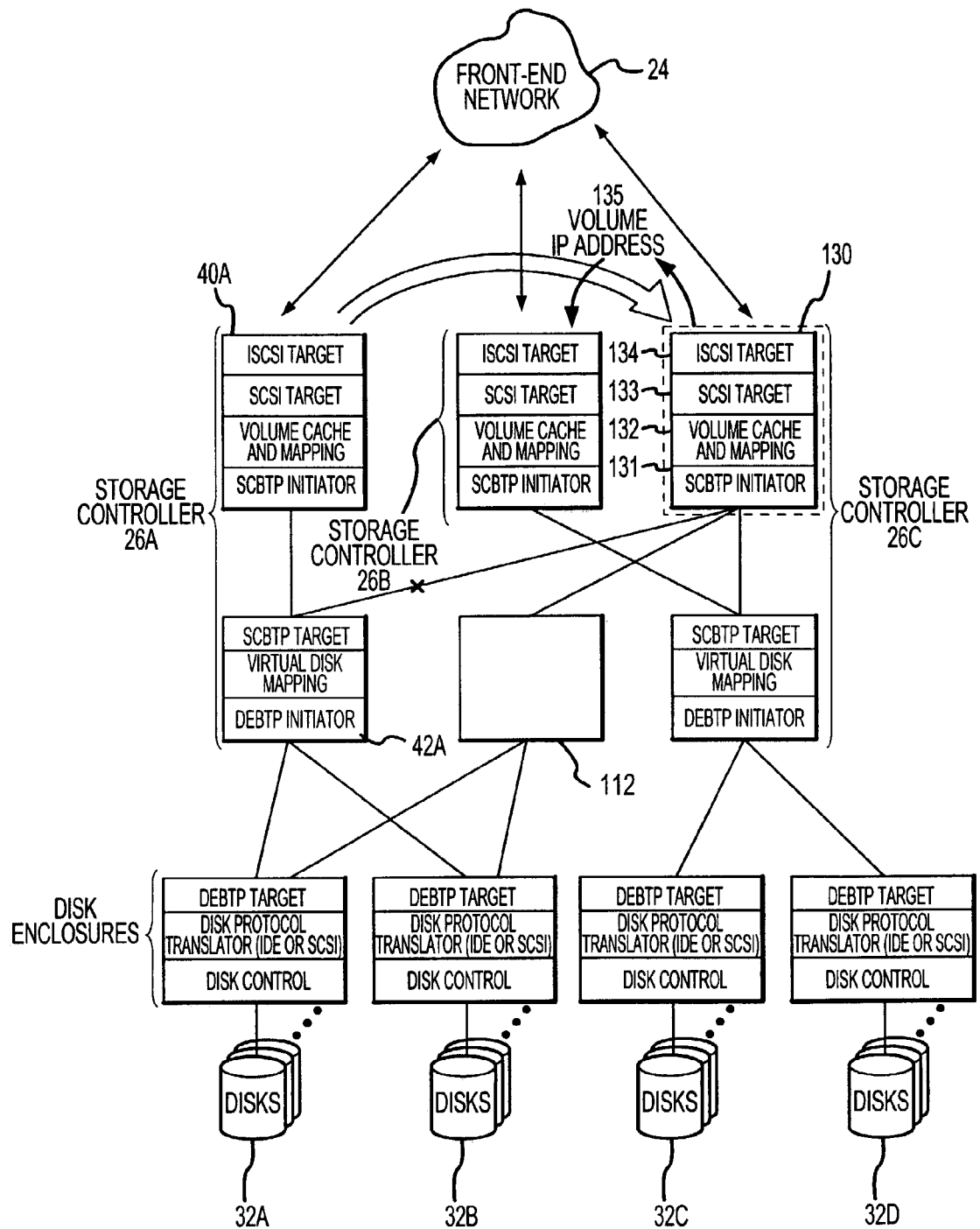
FIG. 8 illustrates an example of a migration of a volume from storage controller 26A to storage controller 26C, in accordance with one embodiment of the present invention.

FIGS. 5–6 and 7–8 relate to examples of migration when a storage controller has failed. FIGS. 5–6 illustrate migration of a virtual disk to a storage controller, and FIGS. 7–8 illustrate migration of a volume to a storage controller. It is understood that the examples of FIGS. 5–8 are illustrative, and the same principles may be utilized in other examples or situations depending upon the particular implementation. In accordance with one embodiment of the present invention, when a storage controller fails, the virtual disks assigned to the storage controller are migrated to another storage controller, and then the volumes associated with the failed storage controller are migrated to another storage controller.

FIG. 5 illustrates an example of logical operations for migrating a virtual disk from a first storage controller to a second storage controller in the event of a failure of the first storage controller, in accordance with one embodiment of the present invention. At operation 100, a new storage controller is selected to handle the virtual disk. At operation 101, the new storage controller is configured to handle the virtual disk. At operation 102, communications is established between the virtual disk and any physical disks related thereto. At operation 103, the mappings and volumes of the virtual disk are configured so that the virtual disk may communicate with the new storage controller. At operation 104, communications between the virtual disk and the volumes on other storage controllers is established.

FIG. 6 illustrates a situation where a virtual disk 42A assigned to storage controller 26A is migrated to storage controller 26B and is shown thereon as virtual disk 112, in this example due to the failure of storage controller 26A. Assuming that storage controller 26B has been selected to be the recipient of the migration of the virtual disk 42A of storage controller 26A, then virtual disk 112 on storage controller 26B is configured. Generally, the protocol stack for the virtual disk 112 is configured from the bottom up, in one embodiment. The protocol stack for the virtual disk 112 may include an SCBTP target portion 114, a virtual disk mapping portion 116, and a DEBTP initiator portion 118 to form the virtual disk 112 on storage controller 26B.

The DEBTP initiator portion 118 of the virtual disk 112 now on storage controller 26B is configured to communicate with the corresponding targets which, in this example, are associated with physical disks 32A, B. This is represented in FIG. 6 by lines 120.

The virtual disk mapping 116 is also configured. As mentioned above, preferably each storage controller maintains a copy of the mappings of other storage controllers so that when storage controller 26A fails, the storage controller 26B already has a copy the mapping information of storage controller 26A.

The SCBTP target portion 114 is also configured, and the SCBTP initiator portion 66 of storage controller 26C which formerly communicated with the virtual disk on storage controller 26A is redirected to use the virtual disk 112 on the newly selected storage controller 26B (this is shown as cross-out 122 and line 124). Hence, the SCBTP portion 66 will then retransmit all outstanding requests to the newly selected storage controller 26B, and if any responses are received from the storage controller 26A previously assigned to this virtual disk, these responses will be ignored.

Accordingly, it can be seen that in this manner, storage controller 26B now hosts the virtual disk 112 formerly hosted by storage controller 26A, and all accesses to the data associated with virtual disk 112 can be successfully completed. Prior to the migration of the virtual disk in this example, storage controller 26B accessed physical disks 32C, D; after the migration, storage controller 26B accesses physical disks 32A, B, C, D. Further, this example illustrates that a virtual disk migration may be performed independently of a volume migration.

FIG. 7 illustrates an example of logical operations for migrating a volume from a first storage controller to a second storage controller in the event of a failure of the first storage controller, in accordance with one embodiment of the present invention. At operation 125, a new storage controller is selected to handle the volume. At operation 126, the new storage controller is configured to handle the volume. At operation 127, requests for the volume are redirected to the IP address of the new storage controller.

In the example of FIG. 8, assume that the volume 40A associated with storage controller 26A is to be migrated to storage controller 26C and is represented thereon as volume 130, in this example as a consequence of the failure of storage controller 26A. The volume migration is preferably performed after completing the operations of the example of FIG. 6 to migrate the virtual disks. Generally, a migration of a volume to another storage controller involves migrating the iSCSI target and the volume to the newly assigned storage controller, as will be described below.

In one embodiment, the migration of a volume involves the notion of a contact IP address of the volume and a distinct IP address for each storage controller, as mentioned above with reference to FIG. 4. A contact IP address may be assigned to one storage controller 26A, B, C of the distributed storage network 20, and the application servers 22A, B, C communicate over the front end network 24 with the storage controllers 26A, B, C initially using the contact IP address. Subsequently, the application servers are directed by the storage controller serving the contact IP address to communicate directly with the storage controller hosting the volume using the distinct IP address of that storage controller. Stated differently, a virtual IP address may be used as the iSCSI contact address for all iSCSI targets in the distributed storage system 20, and one storage controller in the system is assigned this contact address and is responsible for responding to and handling the sessions established with the contact address by redirecting the application servers to the IP address of the storage controller hosting the volume requested by the application server. All of the targets of the volumes 40A, B, C are advertised such that the storage controller which handles the contact IP address is aware of which volumes/storage controllers (and their respective IP addresses) to redirect a session establishment request from an application server 22A, B, C.

During target discovery, the initiators (i.e., application servers 22A, B, C) are given the contact IP address as the IP address of all targets. Target discovery may be performed either by using the iSCSI target discovery mechanism, or using a discovery service defined by iSCSI such as Internet Storage Naming Service (ISNS) or Service Location Protocol (SLP), or a combination of these mechanisms.

When the initiator (i.e., application server 22A, B, C) tries to connect to the storage system 20 for the first time or after a connection failure, the application server connects to the storage controller with the contact address. The storage controller then issues a "redirect response" as defined in iSCSI, which instructs the initiator (i.e., application server) to connect to another IP address that is the distinct IP address of the storage controller assigned to the volume to which the application server seeks access. If a storage controller fails, the application server communicating with the storage controller will try and reestablish an iSCSI session using the contact IP address.

If the storage controller which owns the contact address fails, another storage controller takes over handling the contact address. A conventional election processes may be used to determine which storage controller should handle and own the contact address information.

In FIG. 8, assuming that the virtual disk 42A associated with storage controller 26A has been successfully migrated to another storage controller (such as storage controller 26B, as shown in FIG. 4), and assuming that another storage controller 26C has been selected for assigning the volume 40A from storage controller 26A, then a volume 130 is created to be hosted on storage controller 26C and configured preferably from the bottom portion of the stack upwardly. The SCBTP initiator portion 131 of the volume 130 is configured to communicate with the appropriate virtual disk 112 on storage controller 26B. The volume cache and mapping information 132 from storage controller 26A (which has already been stored by storage controller 26C) is used by storage controller 26C for this volume 130, and the SCSI target information 133 is configured so that this storage controller 26C will properly receive references to this volume 130. The iSCSI target information 134 is configured so that this storage controller 26C will properly receive references to this volume 130.

The storage controller which owns the contact IP address (in this example, storage controller 26B) is updated with the new IP address of the volume 130 (shown as "Volume IP address" 135 in FIG. 8), so that all requests made by an application server 22A, B, C for this volume 130 are properly redirected to storage controller 26C. When an application server tries to establish a connection with the volume, the request is properly redirected to storage controller 26C. Accordingly, it can be seen that a volume 40A has been migrated from a storage controller 26A to another storage controller 26C in the distributed storage network 20. While the volume is represented as 130 in FIG. 8, it is understood that preferably volume 130 is the same as volume 40A, and after migration, storage controller 26C manages volume 130 and any other volumes handled by storage controller 26C such as volume 40C (FIG. 2).

Figure 9:
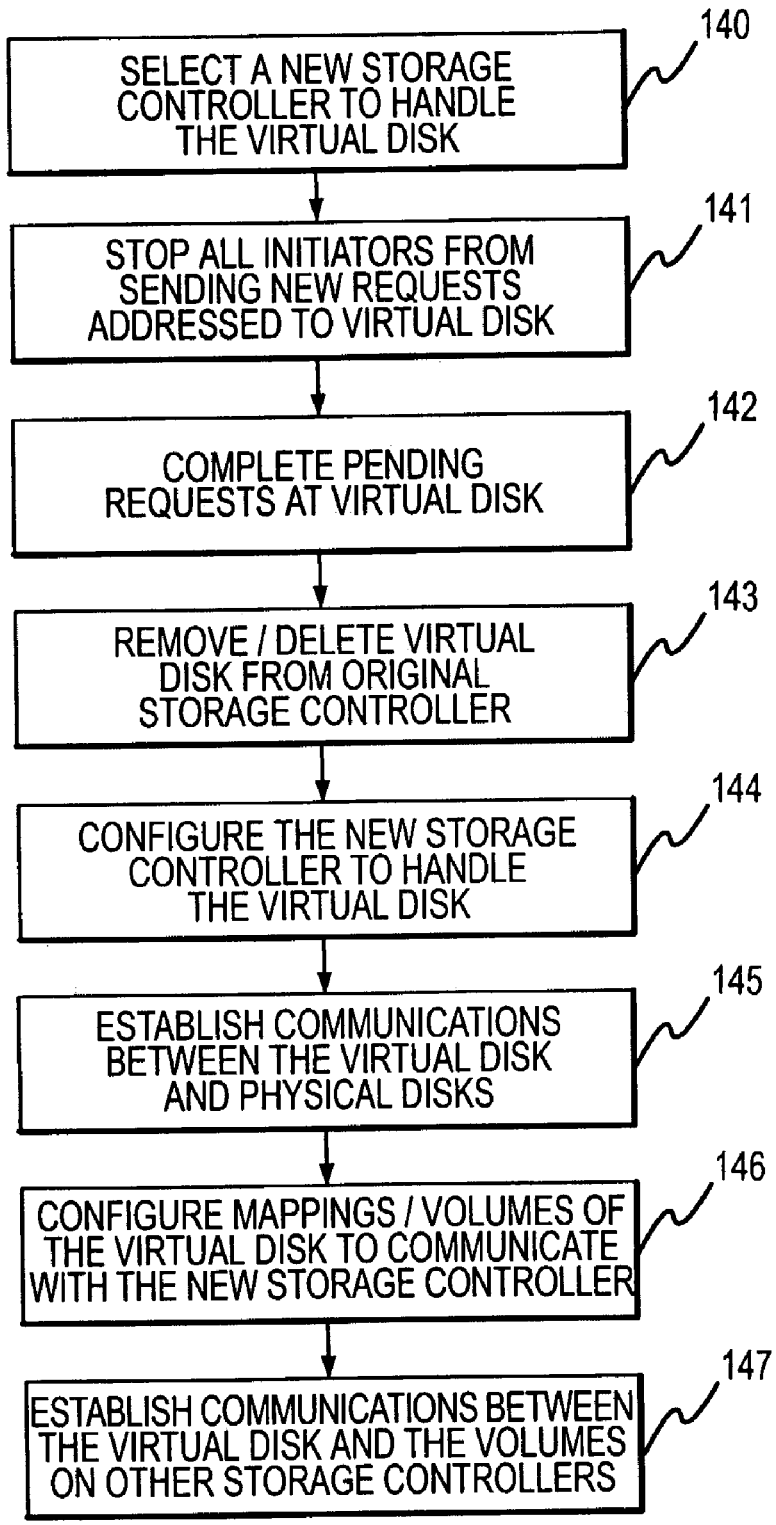
FIG. 9 illustrates an example of logical operations for migrating a virtual disk from a first storage controller to a second storage controller, in accordance with one embodiment of the present invention.
Figure 10:
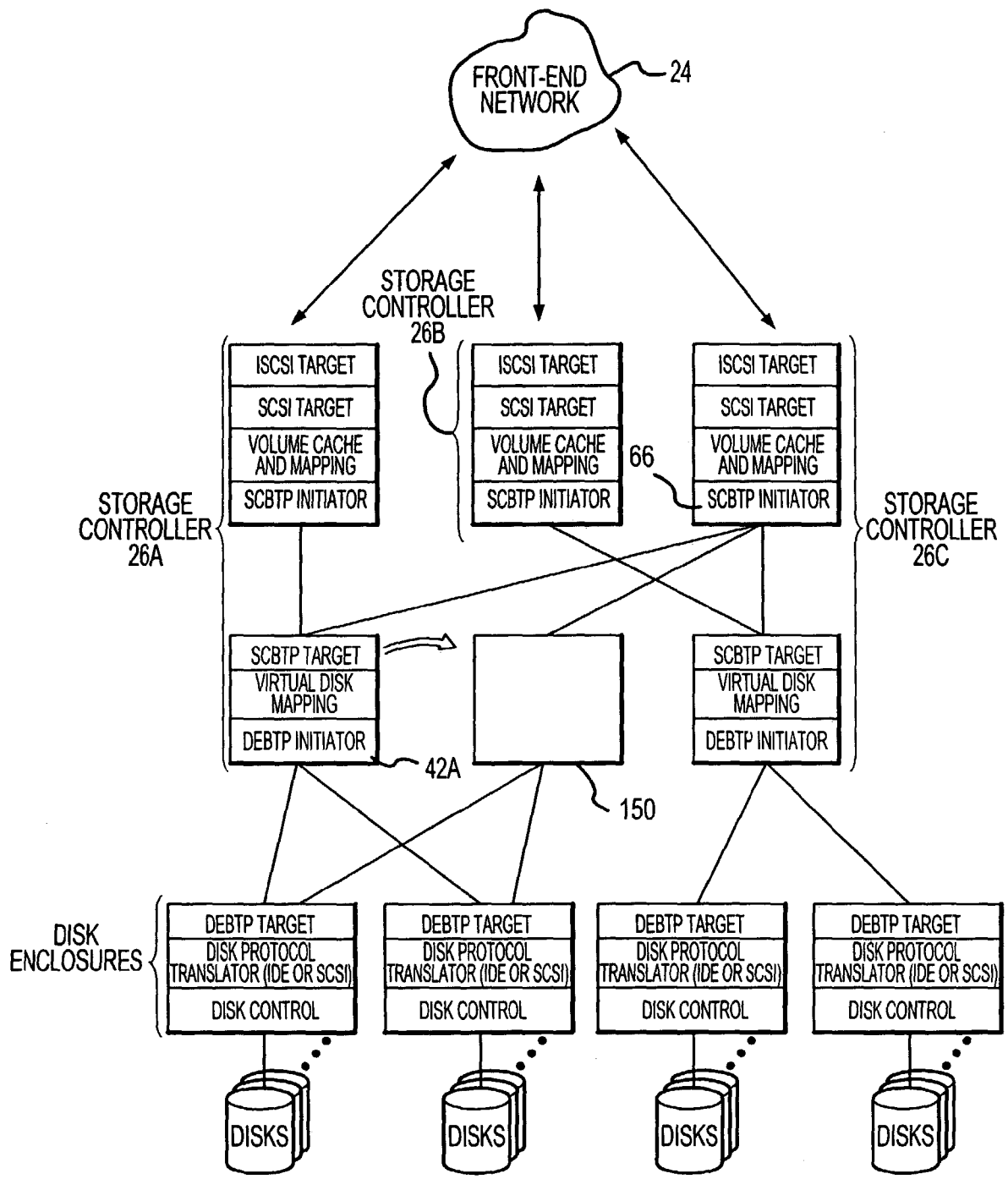
FIG. 10 illustrates an example of a virtual disk migration from storage controller 26A to storage controller 26B, in accordance with one embodiment of the present invention.
Figure 11:
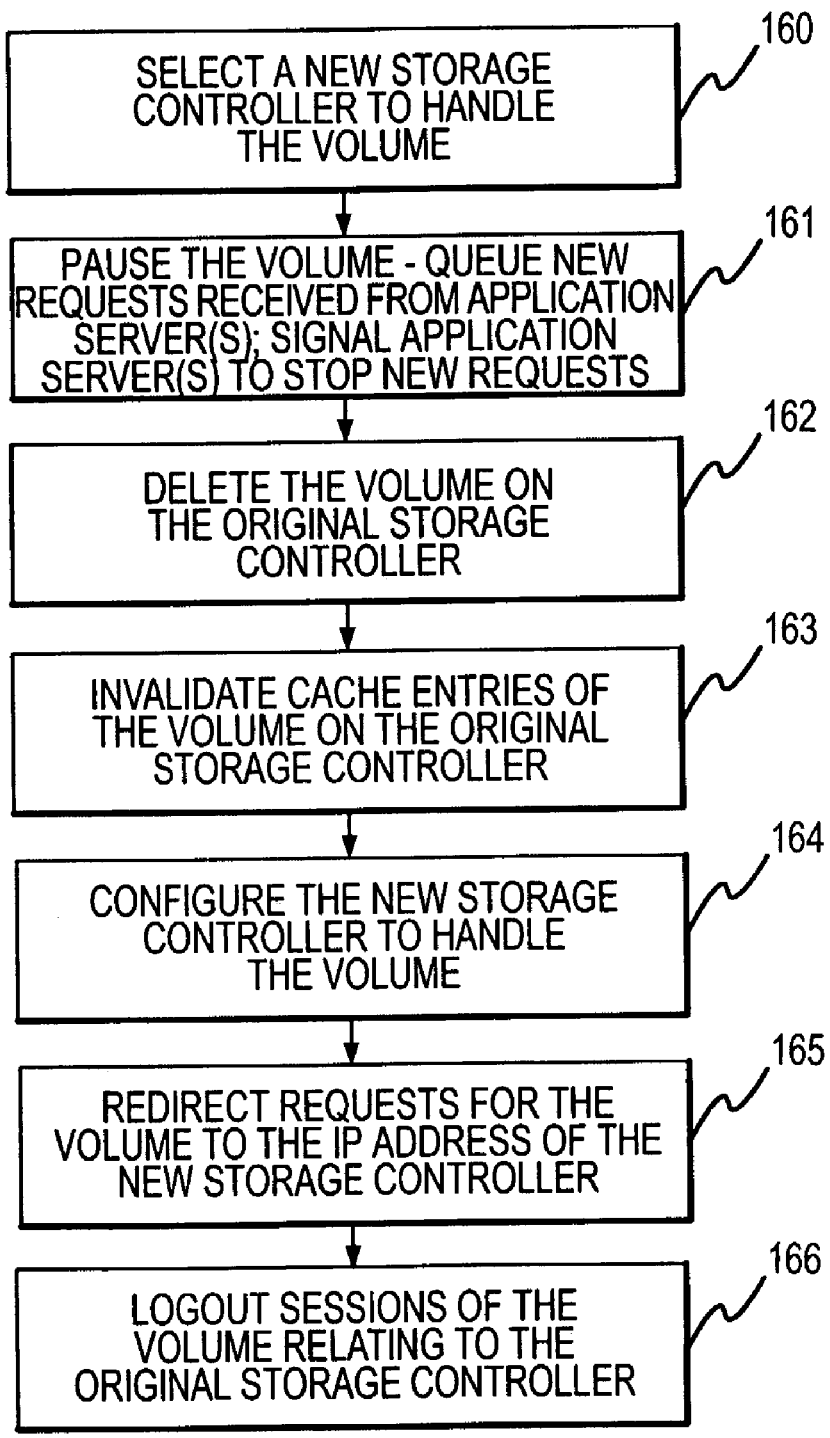
FIG. 11 illustrates an example of logical operations for migrating a volume from a first storage controller to a second storage controller, in accordance with one embodiment of the present invention.
Figure 12:
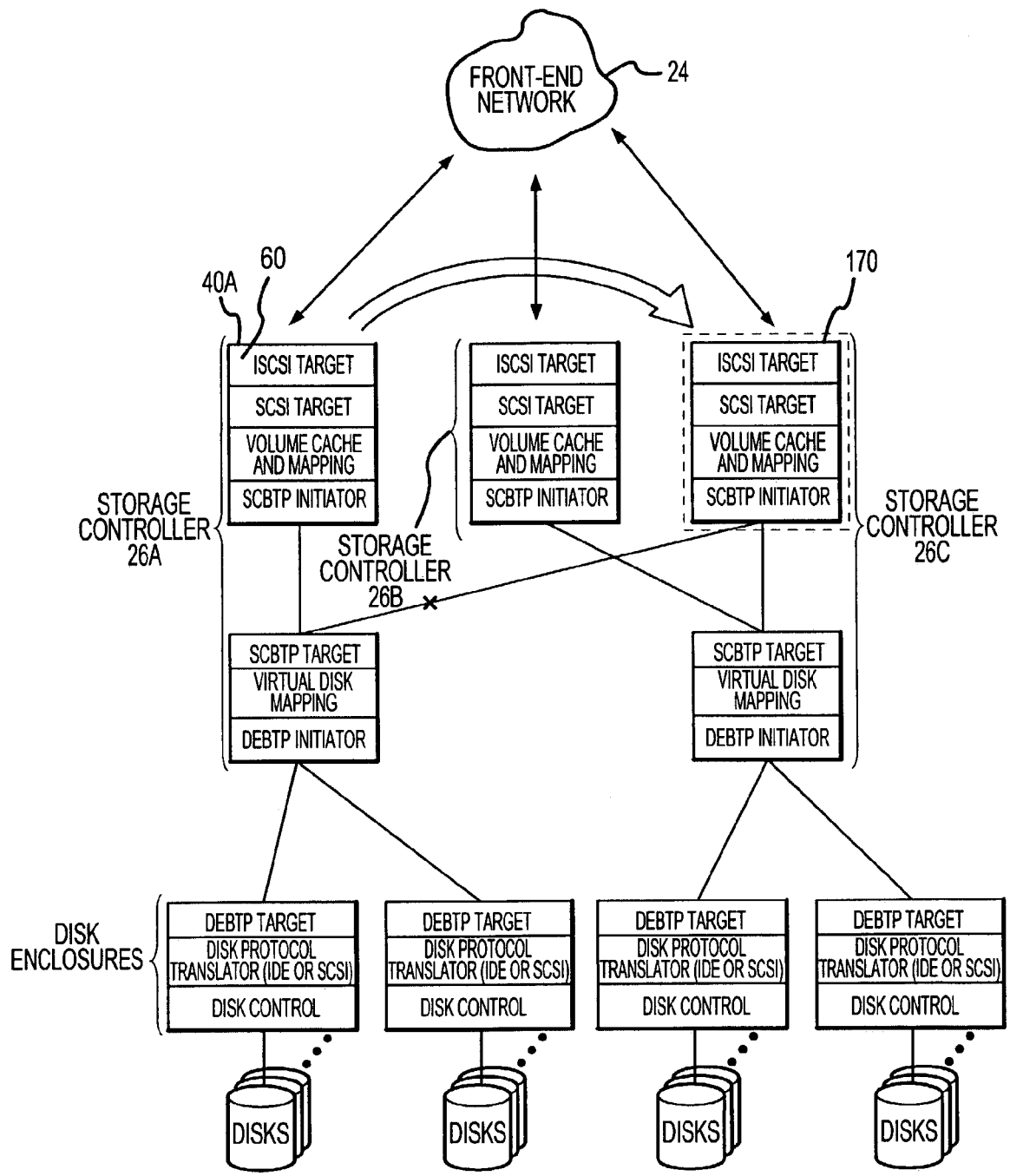
FIG. 12 illustrates an example of a migration of a volume from storage controller 26A to storage controller 26C, in accordance with one embodiment of the present invention.

FIGS. 9–10 and 11–12 relate to examples of performing migration when the storage controller hosting a volume remains functional, for example, for load balancing purposes or other controlled, graceful migration. FIGS. 9–10 illustrate migration of a virtual disk to a storage controller, and FIGS. 11–12 illustrate migration of a volume to a storage controller. It is understood that the examples of FIGS. 9–12 are illustrative, and the same principles may be utilized in other examples or situations depending upon the particular implementation.

FIG. 9 illustrates an example of logical operations for migrating a virtual disk from a first storage controller to a second storage controller, in accordance with one embodiment of the present invention. In contrast with FIG. 5, this migration may occur under the control of or in response to one or more components of the storage system as a controlled or graceful migration. At operation 140, a new storage controller is selected to handle the virtual disk. At operation 141, all initiators, which would normally make requests to the virtual disk, are stopped from sending new requests addressed to the virtual disk. At operation 142, pending requests at the virtual disk are completed, and at operation 143 the virtual disk is removed/deleted from the original storage controller. At operation 144, the new storage controller is configured to handle the virtual disk. At operation 145, communications between the virtual disk and the associated physical disks are established. At operation 146, the mappings/volumes of the virtual disk are configured to communicate with the new storage controller. At operation 147, communications between the virtual disk and volumes on other storage controllers are established.

In the example of FIG. 10, a virtual disk 42A is migrated from storage controller 26A to storage controller 26B—the virtual disk represented as 150. In this embodiment, the original protocol stack for the virtual disk 42A is gracefully shut down at storage controller 26A, and then the virtual disk is migrated to the newly selected storage controller 26B. In one example, all the SCBTP initiators 66 from the volume 40A of the original storage controller 26A are stopped from sending new requests addressed to the original virtual disk 42A. Any outstanding requests for the virtual disk 42A are completed, and the responses generated thereby are returned. The protocol stack configuration for the original virtual disk 42A is disabled from the originally assigned storage controller 26A, and the protocol stack for the virtual disk 150 is configured on the newly selected storage controller 26B, in a manner similar to operations 103–104 of FIG. 5.

For each storage controller which uses the virtual disk 42A, the SCBTP initiator portions thereof are redirected to use the virtual disk 150 on the newly selected storage controller 26B. The SCBTP initiator portions 66 then retransmit all the outstanding requests to virtual disk 150 at the newly selected storage controller 26B, and if any responses are received from the storage controller 26A previously assigned to this virtual disk, it ignores them. Hence, in this example, the virtual disk 42A is gracefully shut down and migrated to a new storage controller 26B, which may be useful to transfer portions of the load being handled by the original storage controller to the newly selected storage controller.

FIG. 11 illustrates an example of logical operations for migrating a volume from a first storage controller to a second storage controller, in accordance with one embodiment of the present invention. In contrast with FIG. 7, this migration may occur under the control of or in response to one or more components of the storage system as a controlled or graceful migration. At operation 160, a new storage controller is selected to handle the volume. At operation 161, the volume is paused. In one example, new requests received by the volume from any application servers are queued, and the application servers are signaled to stop generating any new requests for the volume. At operation 162, the volume is deleted/removed on the original storage controller, and at operation 163, cache entries in the original storage controller that correspond to the volume are invalidated. At operation 164, the new storage controller is configured to handle the volume. At operation 165, requests for the volume are redirected to the new storage controller. In one example, operation 6 informs the storage controller that maintains the contact IP address that the new storage controller is handling the volume. At operation 166, the sessions (i.e., the iSCSI sessions) of the volume relating to the original storage controller are terminated or logged out. In one example, the old storage controller sends a "Request Logout" message to the application server, which logs out the session. The application server is then expected to attempt to login again immediately, using the contact IP address. As shown in FIG. 4, upon such logout, any application server desirous of accessing the volume will reconnect to the storage system using the contact IP address, upon which the storage system will provide the application server with the IP address of the new storage controller now handling the volume.

In the example of FIG. 12, a volume 40A is migrated from storage controller 26A to storage controller 26C and is represented thereon as volume 170. In this embodiment, the original protocol stack for this volume 40A is gracefully shut down, the iSCSI connections for that volume 40A are logged out, and then the volume 40A is migrated to the newly selected storage controller 26C in a manner similar to operations 126–127 of FIG. 7.

In one example, the iSCSI target 60 associated with the volume 40A is paused by queuing new requests and waiting for outstanding requests to complete. A signal may be sent to all initiators (i.e. application servers 22A, B, C) to stop the flow of new requests, yet keep the sessions open. The protocol stack configuration for the volume 40A may be disabled on storage controller 26A (from the top down, in one example), and cache entries for the volume are invalidated on storage controller 26A. The protocol stack is configured as a volume 170 on the newly selected storage controller 26C for this volume 40A, and the storage controller which has the contact IP address (in this example, storage controller 26B) is updated to redirect requests from application servers for this volume to the IP address of the newly selected storage controller 26C. On the storage controller 26A which previously handled volume 40A, a logout on all the iSCSI sessions for the volume may be issued. After the logout response is received by initiators (i.e., application servers), the initiators will try to reestablish the connection using the contact IP address (see operation 95 of FIG. 4), and will get redirected to the distinct IP address of the newly selected storage controller 26C. Hence, in this example, the volume 40A operating on a first storage controller 26A is gracefully shut down and migrated to a new storage controller 26C which may be useful to transfer portions of the load being handled by the original storage controller to the newly selected storage controller. After migration of volume 40A to storage controller 26C, storage controller 26C manages volume 170 and any other volumes handled by storage controller 26C such as volume 40C (FIG. 2).

The storage controllers 22A, B, C shown and described herein may include one or more modules or logic for performing one or more of the operation described herein so that each storage controller is capable of having its volumes 40A, B, C or virtual disks 42A, 42C migrated to other storage controllers, or so that each storage controller is capable of receiving volumes or virtual disks from other storage controllers.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

We claim:

1. In a distributed storage system having volumes and virtual disks associated with a plurality of storage controllers including first, second and third storage controllers, a method for migrating a first volume and a first virtual disk from the first storage controller to the second and third storage controllers, the method comprising:
   migrating the first virtual disk from the first storage controller to the second storage controller;
   handling at the second storage controller requests for data reads/writes associated with the first virtual disk;
   migrating the first volume from the first storage controller to the third storage controller;
   handling at the third storage controller requests for data reads/writes associated with the first volume; and communicating between the second and third storage controllers to handle requests for data reads/writes associated with the first volume and the first virtual disk.

2. The method of claim 1, wherein the distributed system further includes physical disks associated with the first virtual disk and the volumes include volumes associated with the first virtual disk, and wherein the operation of migrating the first virtual disk further comprises:
configuring the second storage controller to communicate with the physical disks; and
configuring volumes associated with the first virtual disk to communicate with the second storage controller in handling data reads/writes associated with the first virtual disk.

3. The method of claim 2, wherein the distributed storage system includes physical disks associated with the first virtual disk and the first virtual disk includes a set of mappings between blocks of data of the virtual disk to blocks of data of the physical disks, and the operation of configuring the second storage controller comprises obtaining a copy of the set of mappings, the copy being continuously maintained at the second storage controller.

4. The method of claim 1, wherein the virtual disks include virtual disks associated with the first volume and the plurality of storage controllers include a contact storage controller having a virtual IP address serving as a contact address for a transferred volume, and wherein the operation of migrating the first volume further comprises:
configuring a second volume at the third storage controller;
configuring the third storage controller to communicate with the virtual disks associated with the first volume; and
updating the contact storage controller to redirect data read/write requests associated with the first volume to the third storage controller.

5. The method of claim 4, wherein the first volume includes a set of mappings between blocks of data of the first volume to blocks of data of the virtual disks associated with the first volume, and the operation of configuring the second volume comprises obtaining a copy of the set of mappings continuously maintained at the third storage controller.

6. The method of claim 1, wherein each of the plurality of storage controllers has a unique IP address, the method further comprising assigning a virtual IP address to one of the plurality of storage controllers, the virtual IP address being different from the unique IP address of any of the plurality of storage controllers; and
wherein the operation of migrating the first volume further comprises redirecting communications received at the virtual IP address and intended for the first volume to an IP address of the third storage controller.

7. A storage system having a plurality of storage controllers coupled to at least one application server for reading and writing data to and from at least one physical disk, the plurality of storage controllers each having a unique IP address, the plurality of storage controllers including first and second storage controllers, comprising:
a module for migrating a volume from the first storage controller to the second storage controller; and
a module for updating a contact storage controller to redirect communications intended for the volume to the second storage controller, the contact storage controller being one of the plurality of storage controllers and having a virtual IP address for contacting by the at least one application server after the at least one application server fails to connect to the volume at the first storage controller, the virtual IP address being different from the unique IP address of any of the plurality of storage controllers.

8. The storage system of claim 7, wherein each of the plurality of storage controllers includes at least one protocol stack having from top to bottom:
an iSCSI target portion providing an iSCSI name for a volume;
a volume cache and mapping portion providing associations between block addresses of at least one volume to block addresses of at least one virtual disk;
an SCBTP initiator portion for communicating with at least one virtual disk; and
wherein the module for migrating the volume includes a module for configuring a protocol stack in the second storage controller upwardly for the volume.

9. The storage system of claim 8, further comprising:
a module for migrating a virtual disk from the first storage controller to a storage controller selected from the plurality of storage controllers to handle the virtual disk;
a module for redirecting an SCBTP initiator portion in any of the plurality of storage controllers in communication with the virtual disk to communicate with the storage controller selected to handle the virtual disk.

10. The storage system of claim 7, wherein each of the plurality of storage controllers includes at least one protocol stack having:
a SCSI target portion providing a logical unit; and
wherein the module for migrating the volume comprises a module for configuring a protocol stack at the second storage controller to provide a logical unit corresponding to the volume.

11. In a distributed storage system having a plurality of storage controllers including first, second and third storage controllers coupled to at least one initiator, the plurality of storage controllers each having a unique IP address, a method for continuing services provided by the first storage controller in response to a failure of the first storage controller, comprising:
migrating a first virtual disk from the first storage controller to the second storage controller;
migrating a first volume from the first storage controller to one of the second and third storage controllers; and
updating one of the plurality of storage controllers to redirect communications from the at least one initiator and intended for the first volume to one of the second and third storage controllers, the one of the plurality of storage controllers having a virtual IP address for contacting by the at least one initiator in response to the failure of the first storage controller, the virtual IP address being different from the unique IP address of any of the plurality of storage controllers.

12. The method of claim 11, wherein migrating the first virtual disk comprises configuring a protocol stack for the virtual disk at the second storage controller.

13. The method of claim 12, wherein the protocol stack comprising from top to bottom a SCBTP target portion, a virtual disk mapping portion, and a DEBTP initiator portion, and configuring the protocol stack comprises configuring the protocol stack upwardly.

14. The method of claim 11, wherein migrating the first volume comprises configuring a protocol stack for the volume on one of the second and the third storage controllers.

15. The method of claim 14 wherein the protocol stack comprises from top to bottom an iSCSI target portion, a SCSI target portion, a volume cache and mapping portion, and an SCBTP initiator portion, and the configuring step includes configuring the protocol stack upwardly.

16. The method of claim 11, wherein each storage controller has at least one protocol stack having an SCBTP initiator portion for communicating with at least one virtual disk, the method further comprising:
redirecting the SCBTP initiator portions in communication with the first virtual disk to communicate with the migrated virtual disk on the second storage controller.

17. In a distributed storage system having a plurality of storage controllers including first and second storage controllers, a method for transferring at least a portion of a load being handled by the first storage controller, comprising:
signaling at least some of the plurality of storage controllers to stop sending new requests addressed to a virtual disk on the first storage controller;
completing outstanding requests for the virtual disk received at the first storage controller;
migrating the virtual disk from the first storage controller to the second storage controller;
redirecting each of the plurality of storage controllers using the virtual disk to communicate with the migrated virtual disk on the second storage controller; and
wherein the second storage controller has a protocol stack including from top to bottom a SCBTP target portion, a virtual disk mapping portion, and a DEBTP initiator portion, and the migrating step includes configuring the protocol stack upwardly for the virtual disk.

18. The method of claim 17, further comprising removing the virtual disk from the first storage controller.

19. A method for load balancing in a distributed storage system having a plurality of storage controllers each having a unique IP address, the plurality of storage controllers including first and second storage controllers coupled to at least one initiator, comprising:
discarding new requests for a volume at the first storage controller while waiting for outstanding requests for the volume to complete;
migrating the volume from the first storage controller to the second storage controller;
updating one of the plurality of storage controllers to redirect requests for the volume to the second storage controller, the one of the plurality of storage controllers having a virtual IP address for contacting by the at least one initiator in response to receiving a logout request from the first storage controller, the virtual IP address being different from the unique IP address of any of the plurality of storage controllers; and
requesting the at least one initiator to logout from the volume.

20. The method of claim 19, further comprising deleting a protocol stack configuration for the volume at the first storage controller.

21. The method of claim 19, wherein the second storage controller has a protocol stack comprising from top to bottom an iSCSI target portion, a SCSI target portion, a volume cache and mapping portion, and an SCBTP initiator portion, and migrating the volume comprises configuring the protocol stack upwardly for the volume.

22. A first storage controller among a plurality of storage controllers coupled to at least one initiator in a distributed storage system, the plurality of storage controllers each having a unique IP address, the first storage controller comprising a processor and a computer readable medium storing therein computer readable instructions that when executed by the processor cause the first storage controller to perform a method for continuing services provided by a second storage controller that has failed, the instructions comprising:
instructions for migrating a virtual disk from the second storage controller to the first storage controller in response to the first storage controller being selected to handle the virtual disk;
instructions for migrating a volume from the second storage controller to the first storage controller in response to the first storage controller being selected to handle the volume; and
instructions for updating one of the plurality of storage controllers to redirect communications from the at least one initiator and intended for the volume to the first storage controller in response to the volume being migrated to the first storage controller, the one of the plurality of storage controllers having a virtual IP address for contacting by the at least one initiator in response to failing to connect to the second storage controller, the virtual IP address being different from the unique IP address of any of the plurality of storage controllers.

23. The first storage controller of claim 22 having first and second protocol stacks, wherein the instructions for migrating the virtual disk include instructions to configure the first protocol stack upwardly for the virtual disk and the instructions for migrating the volume include instructions to configure the second protocol stack upwardly for the volume.

24. A first storage controller among a plurality of storage controllers coupled to at least one initiator in a distributed storage system, each of the plurality of storage controllers having a unique IP address and including at least one volume, the first storage controller comprising a processor and a computer readable medium storing therein computer readable instructions that when executed by the processor cause the first storage controller to act as a contact storage controller for the at least one initiator, the instructions comprising:
instructions to receive a request to access a volume directed to a virtual IP address from an initiator, the virtual IP address being different from the unique IP address of any of the plurality of storage controllers;
instructions for determining a destination storage controller that has the volume; and
instructions for redirecting the initiator to send the request to the destination storage controller.

25. The first storage controller of claim 24 wherein the computer readable instructions stored in the computer readable medium further comprise instructions for receiving updates about transferred volumes from the plurality of storage controllers, and wherein the instructions for determining include instructions to determine the destination storage controller based on the received updates.

* * * * *